Patented Apr. 1, 1941

2,236,540

UNITED STATES PATENT OFFICE 2,236,540

FUNGICIDE

Albert S. Johnston, Smithfield, N. C.

No Drawing. Application March 10, 1939,
Serial No. 261,117

4 Claims. (Cl. 167—14)

This invention relates to fungicidal compounds and sprays to be made from the same, especially for agricultural and horticultural purposes.

The principal ingredient of the fungicide of the present invention is an oxidizing agent, and although various oxidizing agents have long been used as fungicides, such oxidizing agents were too harsh on the plants to which they were applied, even in weak solutions, resulting in great damage to the plants from the fungicide in addition to that already caused by the fungus.

Furthermore, it was the experience of the applicant that the oxidizing effect of most oxygen liberating fungicides was too rapid to satisfactorily kill the fungus growth before the effect was exhausted. To make the solution stronger and sufficient to eradicate entirely the fungus resulted in great fatality to the plants on which it was used; such strong solutions are uneconomical and unnecessary with applicant's invention.

It has been discovered, however, that certain buffer agents may be added to the oxidizing agent to retard its oxidizing action, whereby the use of a rather dilute solution is sufficient to accomplish satisfactory results in eradicating the fungus.

These desirable results are obtained by combining a soluble permanganate of which sodium and potassium are examples as an oxidizing agent with a metallic sulphate as the buffer. It must be borne in mind, however, that all permanganates and sulphates are not satisfactory from the standpoint of effect on the soil and the plants in that while they delay oxidizing action of the permanganate, some are toxic to plant growth. Potassium permanganate is preferred to sodium permanganate. For one reason, it is more readily available in commerce and thus less expensive.

For example, it has been found that such metallic sulphates as chromic, cupric, aluminum and ferric, which are in a highly oxidized state, will satisfactorily serve to retard the oxidizing action of the permanganate. Ferric sulphate, however, is preferred, inasmuch as it produces more beneficial results to the plants, in addition to acting as a buffer agent to retard the oxidizing effect of the permanganate. Ferric sulphate, as in the case of the other sulphates mentioned above, furthermore makes more of the oxygen of the permanganate available for fungicidal purposes than where the permanganate is used alone.

Aside from the latter advantage, however, the main function of the ferric sulphate is to delay the oxidizing action of the permanganate and thus prolong this action over a considerably longer period of time than would be the case where no sulphate were used. A small amount of the permanganate combined with the ferric sulphate will achieve better results than are achieved by a larger amount of permanganate alone. In the latter case, as mentioned in the foregoing, a larger amount of permanganate would be necessary than when using a buffer agent and while the fungus would be killed, so would entirely too many of the plants.

The combination of permanganate and sulphates disclosed above is preferably applied in water in solutions to plants at various stages of growth. The younger plants require a more dilute solution than older plants and in cases where moulds and other fungus growth attack seed beds beginning to sprout young plants, the solution may be sprayed as soon as the fungus appears, and if necessary, the application of the solution may be made at different succeeding intervals as the plants grow larger and even to the time they are set out in the field. Since many fungi are carried in the atmosphere, successive infestation may be experienced in the same bed even though each occurrence is entirely eradicated by the applicant's new fungicide at each application thereof.

While various proportions of the permanganate and sulphate are satisfactory in combination, it is preferred to mix these two ingredients in equal proportions for purposes of economy and efficiency. When used as a solution, it has been found that a strength of two-tenths of one per cent by weight of the mixture in water is sufficient for use on small plants in a bed of about six weeks of age. Plants eight weeks old would probably require a solution of one-half of one per cent, while on plants large enough to transplant to the field, about a one per cent strength solution in water will be needed. The proportions given in the foregoing and the theories set forth are merely given as illustrations and are not to be construed as limitations of the invention, as all applications and uses of the instant invention are intended to be covered hereby.

The ingredients of my preparation may be mixed in their dry state and packaged in airtight containers, in which condition they may be marketed. In such containers the ingredients are non-reactive with each other and may be thus stored for indefinite periods until used.

When the ingredients are mixed in solution and contact organic material, for example, fungi, reaction takes place, resulting in the formation of a fungicide and a salt which is a valuable fertilizer. Thus, not only is the fungi destroyed, but the plants are provided with nutrient as well.

Having thus fully described my invention, what is claimed as new and upon which security by Letters Patent is desired is as follows:

1. A fungicidal composition comprising an alkali metal permanganate and ferric sulphate said sulphate acting to liberate more of the oxygen of the permanganate for fungicidal purposes than is liberated in the absence of said sulphate.

2. A fungicidal composition comprising sodium permanganate and ferric sulphate, said sulphate serving to liberate a higher percentage of the oxygen of the permanganate for fungicidal purposes than is possible in the absence of the sulphate.

3. A fungicidal composition comprising potassium permanganate and ferric sulphate, said sulphate serving to increase the liberation of oxygen from the permanganate for fungicidal purposes.

4. A method of combatting fungi on plants comprising applying to the plants a mixture of potassium permanganate and ferric sulphate, said sulphate serving to increase the liberation of oxygen from the permanganate for fungicidal purposes.

ALBERT S. JOHNSTON.